US012568072B1

(12) United States Patent
Huang et al.

(10) Patent No.: US 12,568,072 B1
(45) Date of Patent: *Mar. 3, 2026

(54) SYNCING DATA WAREHOUSE PERMISSIONS USING SINGLE SIGN-ON AUTHENTICATION

(71) Applicant: SIGMA COMPUTING, INC., San Francisco, CA (US)

(72) Inventors: Donald Huang, San Francisco, CA (US); James L. Gale, San Francisco, CA (US)

(73) Assignee: SIGA COMPUTING, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,303

(22) Filed: Feb. 7, 2024

Related U.S. Application Data

(63) Continuation of application No. 18/078,447, filed on Dec. 9, 2022, now Pat. No. 11,991,163, which is a continuation of application No. 16/913,168, filed on Jun. 26, 2020, now Pat. No. 11,588,805.

(60) Provisional application No. 62/868,405, filed on Jun. 28, 2019.

(51) Int. Cl.
| | |
|---|---|
| *H04L 9/40* | (2022.01) |
| *G06F 9/54* | (2006.01) |
| *G06F 16/28* | (2019.01) |
| *G06F 21/62* | (2013.01) |

(52) U.S. Cl.
CPC .......... *H04L 63/0815* (2013.01); *G06F 9/542* (2013.01); *G06F 16/283* (2019.01); *G06F*

21/6218 (2013.01); *H04L 63/102* (2013.01); *H04L 63/105* (2013.01)

(58) Field of Classification Search
CPC . H04L 63/0815; H04L 63/102; H04L 63/105; H04L 63/101; G06F 9/542; G06F 16/283; G06F 21/6218
See application file for complete search history.

(56) References Cited

U.S. PATENT DOCUMENTS

| | | | | |
|---|---|---|---|---|
| 10,990,627 B1 * | 4/2021 | Gulstone | ............... | G06F 30/327 |
| 11,588,805 B2 * | 2/2023 | Huang | ................ | G06F 21/6218 |
| 11,991,163 B1 * | 5/2024 | Huang | ................. | G06F 16/252 |
| 2008/0134295 A1 * | 6/2008 | Bailey | .................... | G06F 21/30 |
| | | | | 726/4 |

(Continued)

FOREIGN PATENT DOCUMENTS

| | | |
|---|---|---|
| CN | 108111473 A | 6/2018 |

OTHER PUBLICATIONS

International Search Report and Written Opinion, PCT/US2020/039842, Oct. 5, 2020, 12 pages.

*Primary Examiner* — Jeong S Park

(57) ABSTRACT

Syncing data warehouse permissions using single sign-on authentication including establishing a link between a first cloud-based data warehouse and a second cloud-based data warehouse, wherein the link facilitates access to data stored in the second cloud-based data warehouse via the first cloud-based data warehouse; receiving, by the first cloud-based data warehouse, a first query referencing first data stored in the second cloud-based data warehouse; accessing, by the first cloud-based data warehouse, from the second cloud-based data warehouse, the first data; and sending a response to the first query based on the accessed first data.

20 Claims, 7 Drawing Sheets

(56)     References Cited

U.S. PATENT DOCUMENTS

| | | | |
|---|---|---|---|
| 2011/0055399 A1* | 3/2011 | Tung | G06F 3/0481 |
| | | | 709/226 |
| 2012/0227094 A1 | 9/2012 | Begen et al. | |
| 2013/0091171 A1 | 4/2013 | Lee | |
| 2013/0312073 A1 | 11/2013 | Srivastav | |
| 2016/0182525 A1* | 6/2016 | Zhu | H04L 63/20 |
| | | | 726/1 |
| 2016/0239813 A1 | 8/2016 | Ko | |
| 2017/0187705 A1 | 6/2017 | Shim et al. | |
| 2018/0131684 A1* | 5/2018 | Standefer, III | H04L 63/101 |
| 2018/0173715 A1 | 6/2018 | Dunne et al. | |
| 2018/0248866 A1* | 8/2018 | Zhang | H04L 63/0815 |
| 2018/0300715 A1* | 10/2018 | Wang | G06Q 20/10 |
| 2019/0320038 A1* | 10/2019 | Walsh | G06F 9/546 |
| 2019/0342280 A1 | 11/2019 | Shaw et al. | |
| 2020/0403986 A1* | 12/2020 | Gosalia | G06F 9/54 |

* cited by examiner

SYNCING DATA WAREHOUSE PERMISSIONS USING SINGLE SIGN-ON AUTHENTICATION

BACKGROUND

Field of the Invention

The field of the invention is data processing, or, more specifically, methods, apparatus, and products for syncing data warehouse permissions using single sign-on authentication.

Description of Related Art

Modern businesses may store large amounts of data in remote databases within cloud-based data warehouses. This data may be accessed using database query languages, such as structured query language (SQL). However, some query responses may include too much data to present efficiently in a web application.

SUMMARY

Methods, systems, and apparatus for syncing data warehouse permissions using single sign-on authentication. Syncing data warehouse permissions using single sign-on authentication includes determining a data warehouse user account of a data warehouse, wherein the data warehouse user account corresponds to a data analytics service account of a data analytics service, and wherein the data warehouse user account and the data analytics user account are authenticated using a single sign-on (SSO) authentication credential from an SSO authentication provide; determining one or more permissions in the data warehouse for the data warehouse user account; and applying the one or more permissions to the data analytics user account.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
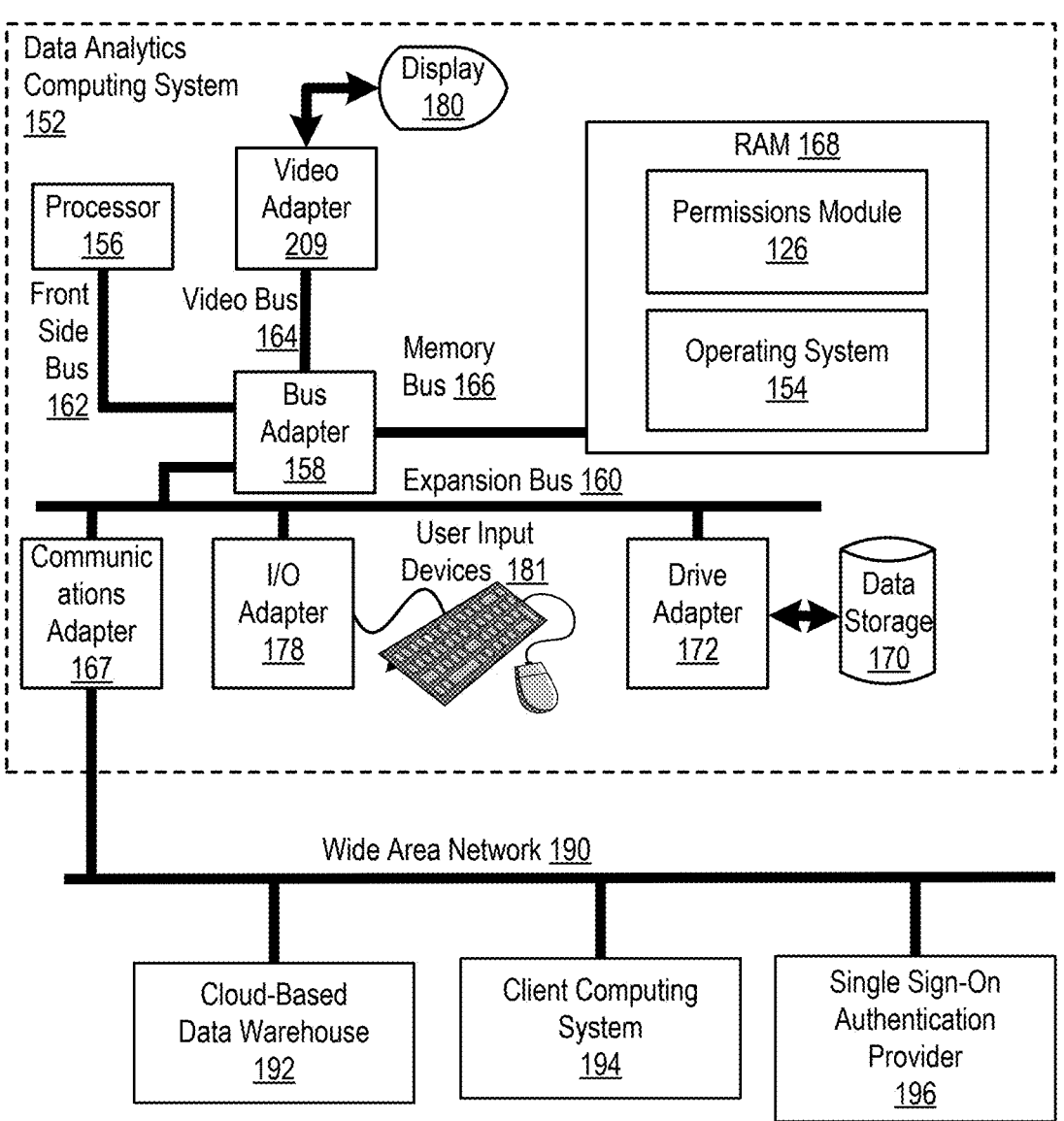
FIG. 1 sets forth a block diagram of an example system configured for syncing data warehouse permissions using single sign-on authentication according to embodiments of the present invention.

Exemplary methods, apparatus, and products for syncing data warehouse permissions using single sign-on authentication in accordance with the present invention are described with reference to the accompanying drawings, beginning with FIG. 1. FIG. 1 sets forth a block diagram of automated computing machinery comprising an exemplary data analytics computing system (152) configured for syncing data warehouse permissions using single sign-on authentication according to embodiments of the present invention. The data analytics computing system (152) of FIG. 1 includes at least one computer processor (156) or 'CPU' as well as random access memory (168) ('RAM') which is connected through a high speed memory bus (166) and bus adapter (158) to processor (156) and to other components of the data analytics computing system (152).

Stored in RAM (168) is an operating system (154). Operating systems useful in computers configured for syncing data warehouse permissions using single sign-on authentication according to embodiments of the present invention include UNIX™, Linux™, Microsoft Windows™, AIX™, BM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the permissions module (126), a module for syncing data warehouse permissions using single sign-on authentication according to embodiments of the present invention.

The data analytics computing system (152) of FIG. 1 includes disk drive adapter (172) coupled through expansion bus (160) and bus adapter (158) to processor (156) and other components of the data analytics computing system (152). Disk drive adapter (172) connects non-volatile data storage to the data analytics computing system (152) in the form of data storage (170). Disk drive adapters useful in computers configured for syncing data warehouse permissions using single sign-on authentication according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example data analytics computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example data analytics computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary data analytics computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for syncing data warehouse permissions using single sign-on authentication according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client computing system (194). The cloud-based data warehouse (192) is a computing system or group of computing systems that hosts a database for access over the wide area network (190). The client computing system (194) is a computing system that accesses the database via the data analytics computing system (152).

Figure 2:
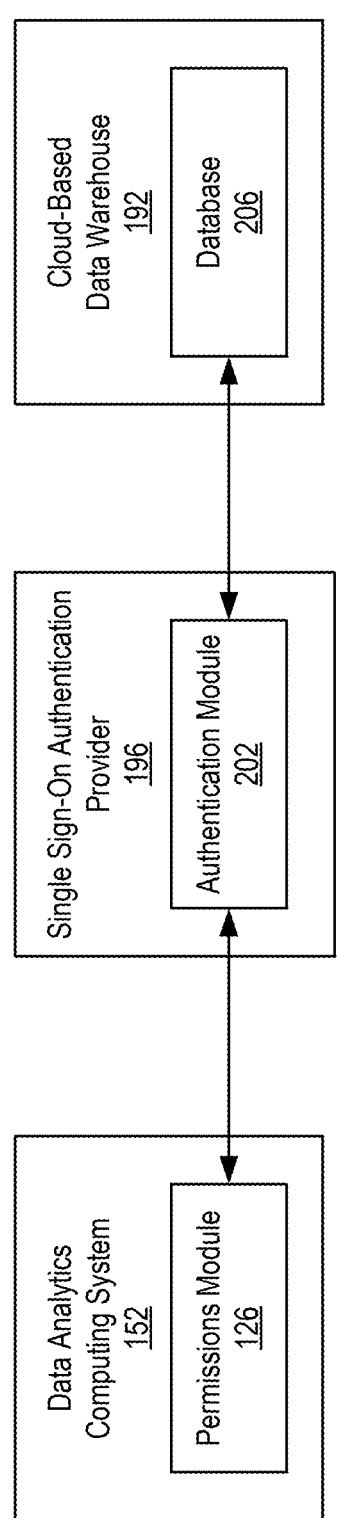
FIG. 2 sets forth a block diagram of an example system configured for syncing data warehouse permissions using single sign-on authentication according to embodiments of the present invention.

FIG. 2 shows an exemplary block diagram of a system for syncing data warehouse permissions using single sign-on authentication according to embodiments of the present invention. As shown in FIG. 2, the system includes a data analytics computing system (152), a cloud-based data warehouse (192) and a single sign-on authentication provider (196). The data analytics computing system (152) includes a permissions module (126). The cloud-based data warehouse (192) includes a database (206). The single sign-on authentication provider (196) includes an authentication module (202).

The authentication module (202) is hardware, software, or an aggregation of hardware and software configured to facilitate single-sign on (SSO) authentication. SSO authentication is an authentication scheme whereby a user can access multiple independent systems using a single set of authentication credentials (e.g., username and password). In this example, the authentication module (202) facilitates access to both the cloud-based data warehouse (192) and the data analytics computing system (152) using a same set of authentication credentials. The database (206) is a collection of data stored in the cloud-based data warehouse (192) and management systems for the data. The management systems may receive database queries, such as structure query language (SQL) queries, and respond to queries with a data set.

The permissions module (126) is hardware, software, or an aggregation of hardware and software configured to perform syncing data warehouse permissions using single sign-on authentication. The database (206) may maintain a set of users and enforce certain permissions (e.g., "grants") with respect to access to particular portions of data (e.g., tables, views, etc.) by particular users or groups of users. For example, a particular table may have permissions allowing certain users or groups of users to read data from the table, permissions allowing certain users or groups of users to add, delete, or modify rows in the table, etc.

Similarly, the data analytics computing system (152) may also maintain its own set of users and enforce its own permissions. For example, the data analytics computing system (152) may enforce access to particular tables or views in the database (206) via the data analytics computing system (152). The data analytics computing system (152) may also enforce access to analytics tools provided to users to analyze data stored in the database (206) (e.g., worksheets, user interfaces, dashboards, etc.). As both the cloud-based data warehouse (192) and data analytics computing system (152) maintain their own sets of users and permissions, the permissions of a given user account in the data analytics computing system (152) should reflect the permissions of a corresponding user account in the cloud-based data warehouse (192) to ensure proper functionality of the data analytics computing system (152). Accordingly, SSO authentication may be used to guarantee that a particular user ID used on both the data analytics computing system (152) and the cloud-based data warehouse (192) correspond to a same user.

To perform syncing data warehouse permissions using single sign-on authentication, the permissions module (126) may determine a data warehouse user account of a cloud-based data warehouse (192), wherein the data warehouse user account corresponds to a data analytics user account of a data analytics service (e.g., of the data analytics computing system (152)). Determining the data warehouse user account may be performed by iterating or traversing a list of data warehouse user accounts and selecting a next data warehouse user account in the list. Determining the data warehouse user account may also comprise iterating or traversing a list of data analytics user accounts and selecting a data warehouse user account corresponding to data analytics user account. As both the data warehouse user account and data analytics user account are accessed using SSO authentication, it is ensured that a data warehouse user account may be effectively determined by selecting a data analytics user account.

Determining a data warehouse user account may be performed in response to a notification from the single sign-on authentication provider (196) that the data warehouse user account was created or provisioned. Accordingly, the data warehouse user account may be determined as the data warehouse user account indicated in the notification. The permissions module (126) and/or other functionality of the data analytics computing system (152) may then create or provision, in response to the notification, a data analytics user account corresponding to the data warehouse user account indicated in the notification.

The permission module (126) may then determine one or more permissions in the cloud-based data warehouse (192) for the data warehouse user account. Determining the one or more permissions may comprise requesting, from the cloud-based data warehouse (192), database metadata. The database metadata may comprise data describing tables, views, or other data of the database (206). The database metadata may comprise schema data of the database (206). The database metadata may indicate the permissions. For example, the database metadata may comprise a listing of tables or other data, and their corresponding permissions. Requesting the database metadata may be performed by iterating through or "crawling" tables of the database (206). For example, requesting the database metadata may include first requesting a list of tables. Then, for each table in the received list, table-level metadata can be requested.

Determining the one or more permissions may comprise identifying, from the received database metadata, permissions corresponding to the determined data warehouse user account. For example, where the received database metadata indicates permissions for multiple users, determining the one or more permissions may comprise identifying permissions indicating a user ID or other identifier of the determined user. As another example, the received database metadata may comprise permissions for users of a particular role or other grouping of users. Accordingly, determining the one or more permissions may comprise identifying permissions for the role or other group that includes the determined data warehouse user account.

Determining the one or more permissions may comprise accessing the data warehouse using the determined data warehouse user account. For example, a token, cookie, or other credential may be received from the single sign-on authentication provider (196) allowing the permissions module (126) to access the cloud-based data warehouse (192) using the determined data warehouse user account. The database metadata may then be requested using the data warehouse user account. For example, the database (206) may be configured to respond to a request for all tables by returning only those tables accessible to a requesting data warehouse user account. Thus, only the database metadata applicable to a particular user is returned in response to the request. Where a particular data warehouse user account requests database metadata for a particular table, the returned database metadata may then indicate the permissions for that particular user with respect to the particular table. As permissions indicated in the database metadata may be presumed to be applicable to the requesting data warehouse user account, the need to parse though permissions for other users or groups is eliminated.

The permissions module (126) may then apply the one or more permissions to the data analytics user account (e.g., the data analytics user account corresponding to the determined data warehouse user account). For example, permissions for a particular table in the data analytics computing system (152) may then be modified to be the same as in the cloud-based data warehouse (192). Applying the one or more permissions to the data analytics user account may also comprise applying the one or more permissions in response to a permission in the cloud-based data warehouse (192) being more restrictive than in the data analytics computing system (152).

For example, assume a data warehouse user account has read-write access to a particular table in the cloud-based data warehouse (192), but the corresponding data analytics user account has only read access to the particular table via the data analytics computing system (152). In this example, the data warehouse user account permissions are less restrictive than the data analytics user account. Accordingly, the permissions of the data warehouse user account would not be applied to the data analytics user account. This allows administrators and users of the data analytics computing system (152) to apply additional levels of security or granularity for accessing data stored in the cloud-based data warehouse (192). Where one or more permissions of the data warehouse user account are not applied to the data analytics user account, a notification or log entry may be generated. The permissions of the data warehouse user account may be updated to reflect the data analytics user account (e.g., via an exposed Application Program Interface (API) or other service).

Continuing with the above example, assume a data warehouse user account has read access to a particular table in the cloud-based data warehouse (192), but the corresponding data analytics user account has read-write access to the particular table in the data analytics computing system (152). In this example, the data warehouse user account permissions are more restrictive than the data analytics user account (e.g., fewer actions are available to the data warehouse user account). Accordingly, the permissions of the data warehouse user account would be applied to the data analytics user account, resulting in the data analytics user account only having read access to the particular table. This ensures that the data analytics user account does not attempt to perform an action that will ultimately fail when submitted to the cloud-based data warehouse (192).

The operations described above with respect to the permissions module (126) may be performed at a predefined interval. For example, the permissions module (126) may iterate through data analytics user accounts at a predefined interval and sync the permissions of each data analytics user account with their corresponding data warehouse user account.

Figure 3:
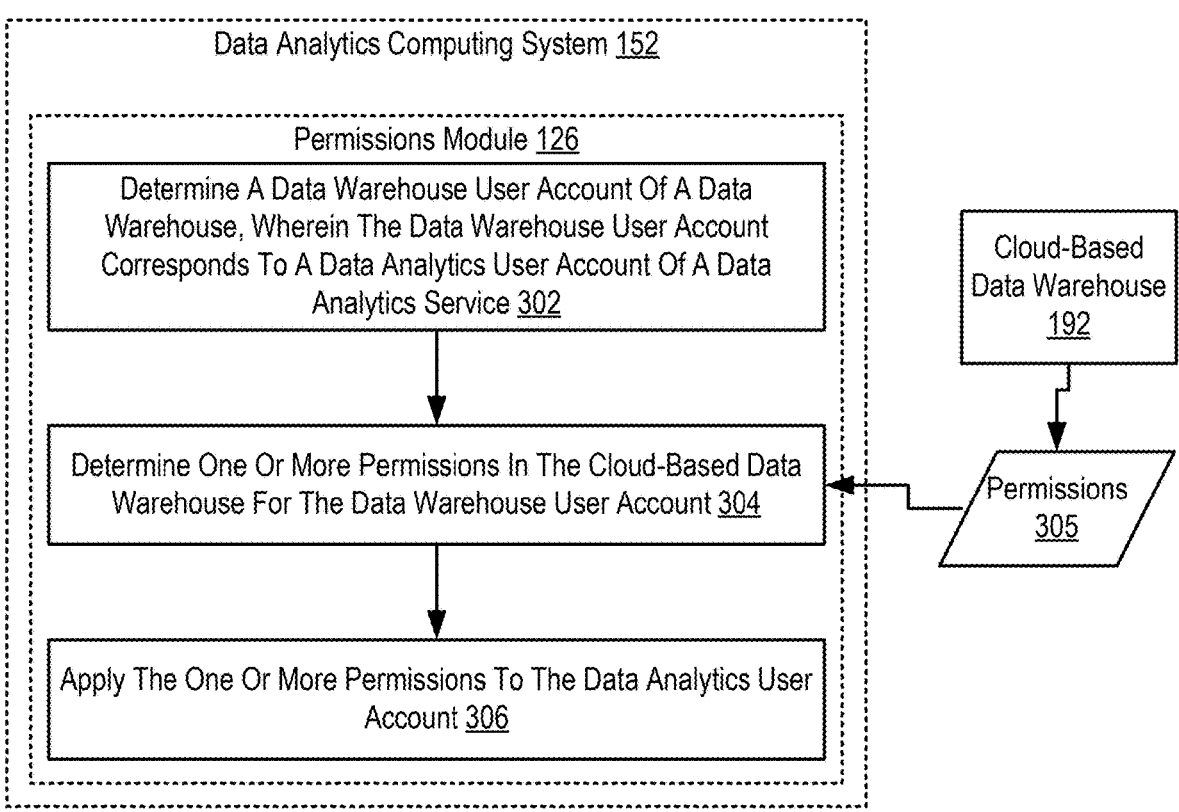
FIG. 3 sets forth a flow chart illustrating an exemplary method for syncing data warehouse permissions using single sign-on authentication according to embodiments of the present invention.

For further explanation, FIG. 3 sets forth a flow chart illustrating an exemplary method for syncing data warehouse permissions using single sign-on authentication according to embodiments of the present invention that includes determining (302) (e.g., by a permissions module (126) of a data analytics computing system (152)) a data warehouse user account of a cloud-based data warehouse (192), wherein the data warehouse user account corresponds to a data analytics user account of a data analytics service (e.g., of the data analytics computing system (152)). Determining the data warehouse user account may be performed by iterating or traversing a list of data warehouse user accounts and selecting a next data warehouse user account in the list. Determining the data warehouse user account may also comprise iterating or traversing a list of data analytics user accounts and selecting a data warehouse user account corresponding to data analytics user account. As both the data warehouse user account and data analytics user account are accessed using SSO authentication, it is ensured that a data warehouse user account may be effectively determined by selecting a data analytics user account. Determining a data warehouse user account may be performed in response to a notification the data warehouse user account was created or provisioned.

The method of FIG. 3 also includes determining (304) one or more permissions (305) in the cloud-based data warehouse (192) for the data warehouse user account. Determining (304) the one or more permissions (305) may comprise requesting the permissions (305) from the cloud-based data warehouse (192). The permissions (305) may be requested using an API or other service exposed by the cloud-based data warehouse (192). The permissions (305) may also be requested by issuing commands (e.g., database queries, SQL queries) to the cloud-based data warehouse.

For example, commands may be issued by using an administrator or privileged user account of the cloud-based data warehouse. Accordingly, the commands issued to the cloud-based data warehouse requesting the permissions (305) may indicate the determined data warehouse user account or a role of the determined data warehouse user account. The commands may also not specify the determined data warehouse user account. Accordingly, the received permissions (305) may be applicable to multiple data warehouse user accounts or roles and require subsequent parsing to identify the particular permissions (305) for the determined data warehouse user account. As another example, commands may be issued using the determined data warehouse user account. The permissions (305) may be embodied as schema data or other database metadata.

The method of FIG. 3 also includes applying (306) (e.g., by the permissions module (126) of the data analytics computing system (152)) the one or more permissions (305) to the data analytics user account (e.g., the data analytics user account corresponding to the determined (302) data warehouse user account). For example, permissions (305) for a particular table in the data analytics computing system (152) may then be modified to be the same as in the cloud-based data warehouse (192). Applying the one or more permissions (305) to the data analytics user account may also comprise applying the one or more permissions (305) in response to a permissions (305) in the cloud-based data warehouse (192) being more restrictive than in the data analytics computing system (152).

For example, assume a data warehouse user account has read-write access to a particular table in the cloud-based data warehouse (192), but the corresponding data analytics user account has only read access to the particular table via the data analytics computing system (152). In this example, the data warehouse user account permissions (305) are less restrictive than the data analytics user account. Accordingly, the permissions (305) of the data warehouse user account would not be applied to the data analytics user account. This allows administrators and users of the data analytics computing system (152) to apply additional levels of security or granularity to accessing data from the cloud-based data warehouse (192). Where one or more permissions (305) of the data warehouse user account are not applied to the data analytics user account, a notification or log entry may be generated. The permissions of the data warehouse user account may be updated to reflect the data analytics user account (e.g., via an exposed Application Program Interface (API) or other service).

Continuing with the above example, assume a data warehouse user account has read access to a particular table in the cloud-based data warehouse (192), but the corresponding data analytics user account has read-write access to the particular table in the data analytics computing system (152). In this example, the data warehouse user account permissions (305) are more restrictive than the data analytics user account (e.g., fewer actions are available to the data warehouse user account). Accordingly, the permissions (305) of the data warehouse user account would be applied to the data analytics user account, resulting in the data analytics user account only having read access to the particular table. This ensures that the data analytics user account does not attempt to perform an action that will ultimately fail when submitted to the cloud-based data warehouse (192).

Figure 4:
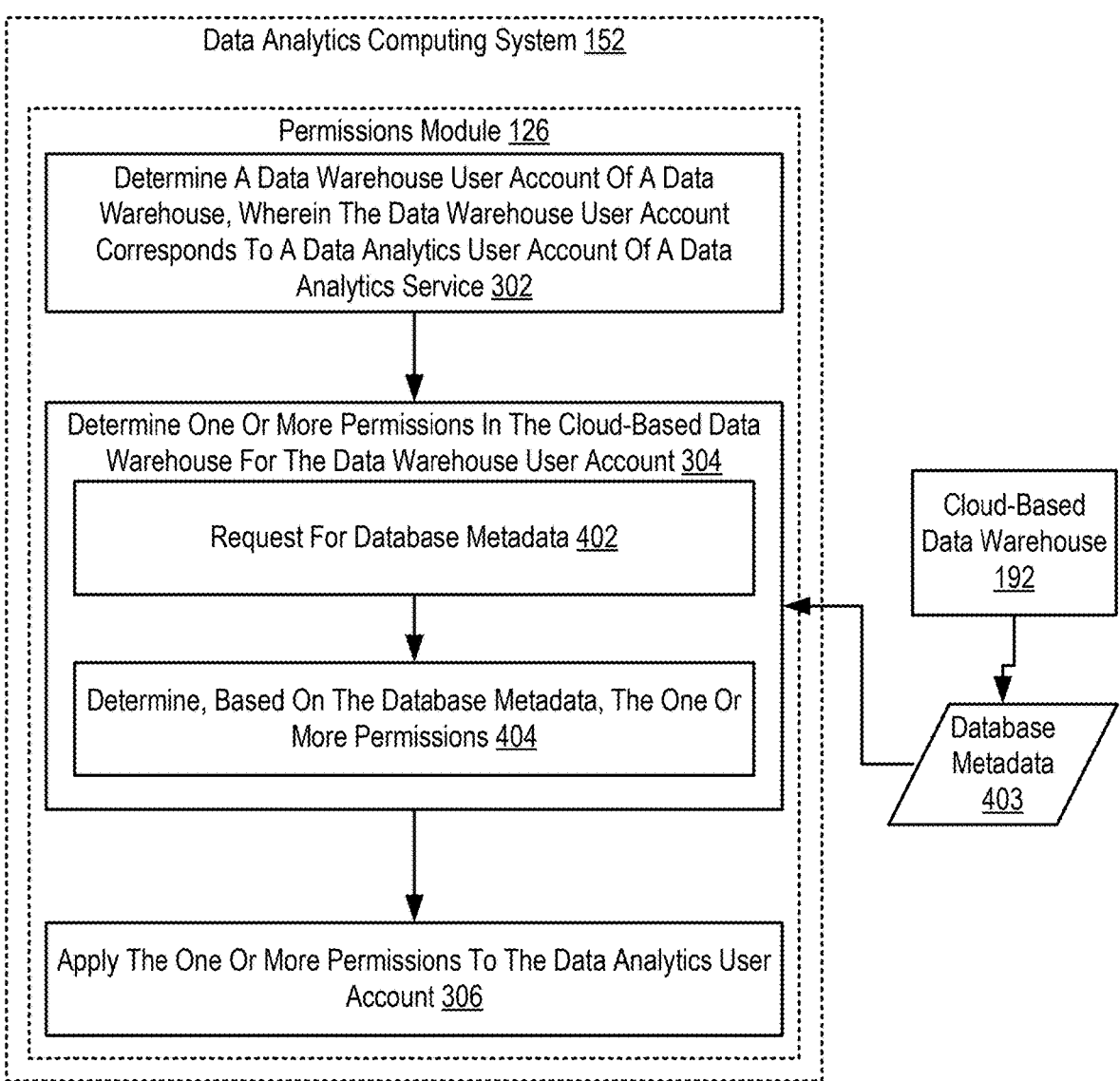
FIG. 4 sets forth a flow chart illustrating an exemplary method for syncing data warehouse permissions using single sign-on authentication according to embodiments of the present invention.

For further explanation, FIG. 4 sets forth a flow chart illustrating an exemplary method for syncing data warehouse permissions using single sign-on authentication according to embodiments of the present invention that includes determining (302) (e.g., by a permissions module (126) of a data analytics computing system (152)) a data warehouse user account of a cloud-based data warehouse (192), wherein the data warehouse user account corresponds to a data analytics user account of a data analytics service; determining (304), one or more permissions in the cloud-based data warehouse (192) for the data warehouse user account; and applying (306) the one or more permissions to the data analytics user account.

The method of FIG. 4 differs from FIG. 3 in that determining (304), one or more permissions in the cloud-based data warehouse (192) for the data warehouse user account comprises requesting (402) database metadata (403). The database metadata (403) may comprise data describing tables, views, or other data of a database (206). The database metadata (403) may comprise schema data of the database (206). The database metadata (403) may indicate the permissions. For example, the database metadata (403) may comprise a listing of tables or other data, and their corresponding permissions. Requesting (402) the database metadata (403) may be performed by iterating through or "crawling" tables of the database (206). For example, requesting (402) the database metadata (403) may include first requesting database metadata (403) comprising list of tables. Then, for each table in the received database metadata (403), table-level database metadata (403) can be requested (402).

The method of FIG. 4 further differs from FIG. 3 in that determining (304), one or more permissions in the cloud-based data warehouse (192) for the data warehouse user account comprises determining (404), based on the database metadata (403), the one or more permissions. Determining (404), based on the database metadata (403), the one or more permissions may comprise identifying, from the received database metadata (403), permissions corresponding to the determined data warehouse user account. For example, where the received database metadata (403) indicates permissions for multiple users, determining (404) the one or more permissions may comprise identifying permissions indicating a user ID or other identifier of the determined user. As another example, the received database metadata (403) may comprise permissions for users of a particular role or other grouping of users. Accordingly, determining (404) the one or more permissions may comprise identifying permissions for the role or other group that includes the determined data warehouse user account.

Figure 5:
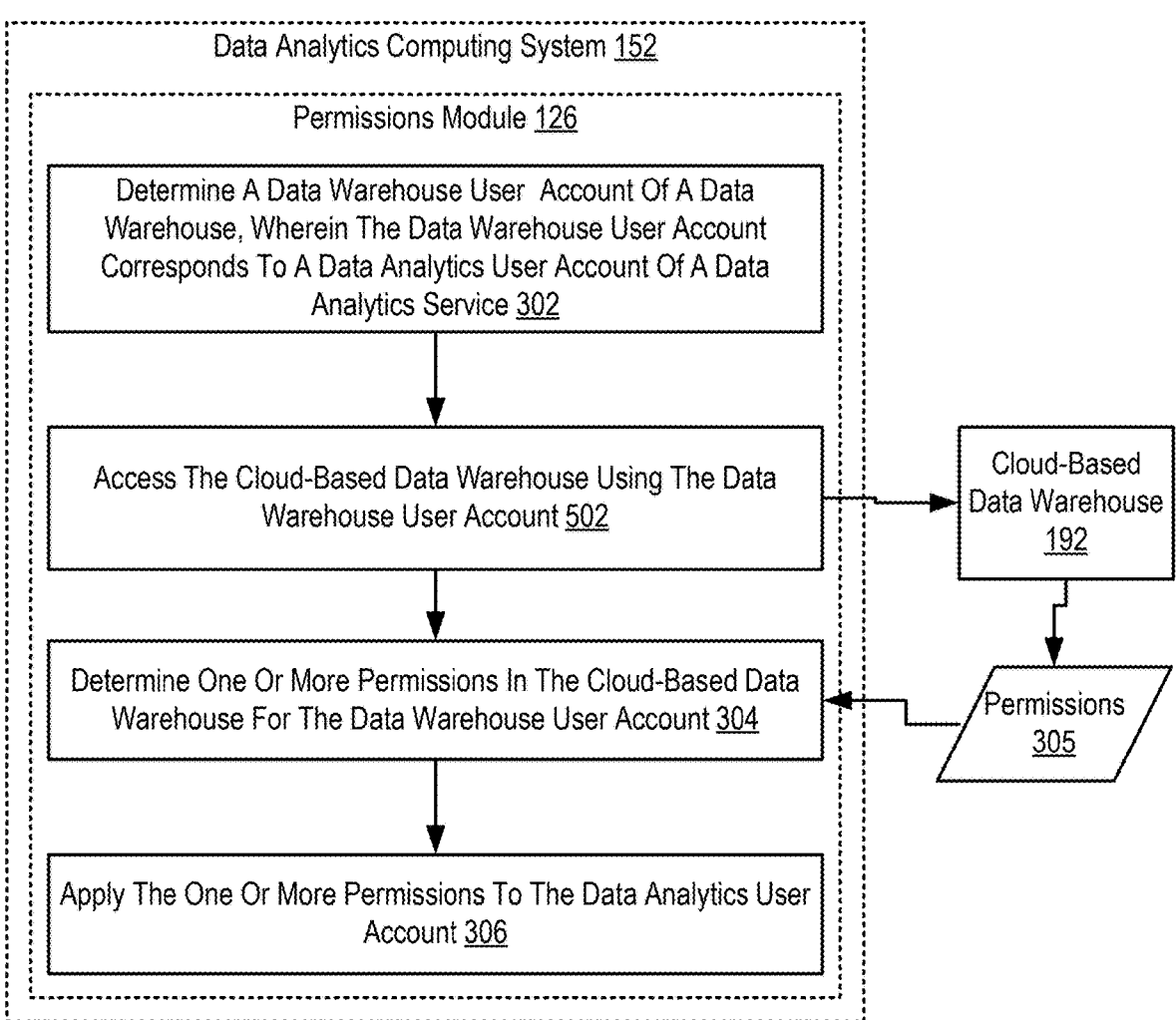
FIG. 5 sets forth a flow chart illustrating an exemplary method for syncing data warehouse permissions using single sign-on authentication according to embodiments of the present invention.

For further explanation, FIG. 5 sets forth a flow chart illustrating an exemplary method for syncing data warehouse permissions using single sign-on authentication according to embodiments of the present invention that includes determining (302) (e.g., by a permissions module (126) of a data analytics computing system (152)) a data warehouse user account of a cloud-based data warehouse (192), wherein the data warehouse user account corresponds to a data analytics user account of a data analytics service; determining (304), one or more permissions (305) in the cloud-based data warehouse (192) for the data warehouse user account; and applying (306) the one or more permissions to the data analytics user account.

The method of FIG. 5 differs from FIG. 3 in that the method of FIG. 5 includes accessing (502) (e.g., by the permissions module (126) of the data analytics computing system (152)) the cloud-based data warehouse (192) using the data warehouse user account (e.g., the determined (302) data warehouse user account). For example, a token, cookie, or other credential may be received from the single sign-on authentication provider (196) allowing the permissions module (126) to access the cloud-based data warehouse (192) using the determined data warehouse user account. The permissions (305) (e.g., database metadata (403)) may then be requested using the data warehouse user account. For example, the database (206) may be configured to respond to a request for all tables by returning only those tables accessible to a requesting data warehouse user account. Thus, only the permissions (305) (e.g., database metadata (403)) applicable to a particular user is returned in response to the request. Where a data warehouse user account is used to request permissions (305) for a particular table, the returned permissions (305) may then correspond to that data warehouse user account user with respect to the particular table. As the received permissions (305) are applicable to the requesting data warehouse user account, the need to parse though permissions for other users or groups is eliminated.

Figure 6:
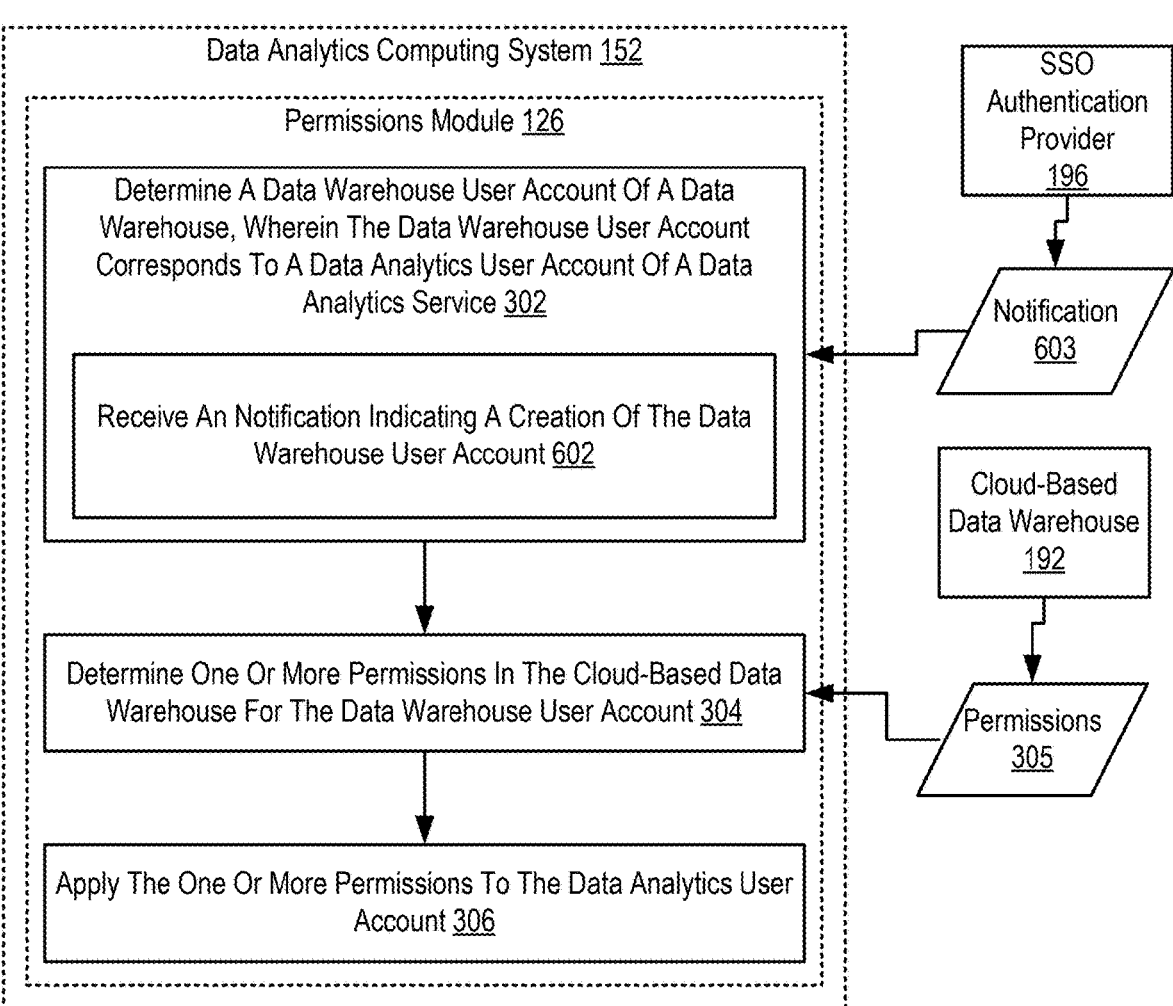
FIG. 6 sets forth a flow chart illustrating an exemplary method for syncing data warehouse permissions using single sign-on authentication according to embodiments of the present invention.

For further explanation, FIG. 6 sets forth a flow chart illustrating an exemplary method for syncing data warehouse permissions using single sign-on authentication according to embodiments of the present invention that includes determining (302) (e.g., by a permissions module (126) of a data analytics computing system (152)) a data warehouse user account of a cloud-based data warehouse (192), wherein the data warehouse user account corresponds to a data analytics user account of a data analytics service; determining (304), one or more permissions (305) in the cloud-based data warehouse (192) for the data warehouse user account; and applying (306) the one or more permissions to the data analytics user account.

The method of FIG. 6 differs from FIG. 3 in that determining (302) a data warehouse user account of a cloud-based data warehouse (192) comprises receiving (602) (e.g., by the permissions module (126) of the data analytics computing system (152), from the single sign-on authentication provider (196)) a notification (602) indicating a creation of the data warehouse user account. For example, a data warehouse user account may be created or provisioned in response to signing in to the cloud-based data warehouse (192) using single sign-on authentication credentials via the single sign-on authentication provider (196). The single sign-on authentication provider (196) may then send the notification (603) to the permissions module (126) indicating the data warehouse user account.

Figure 7:
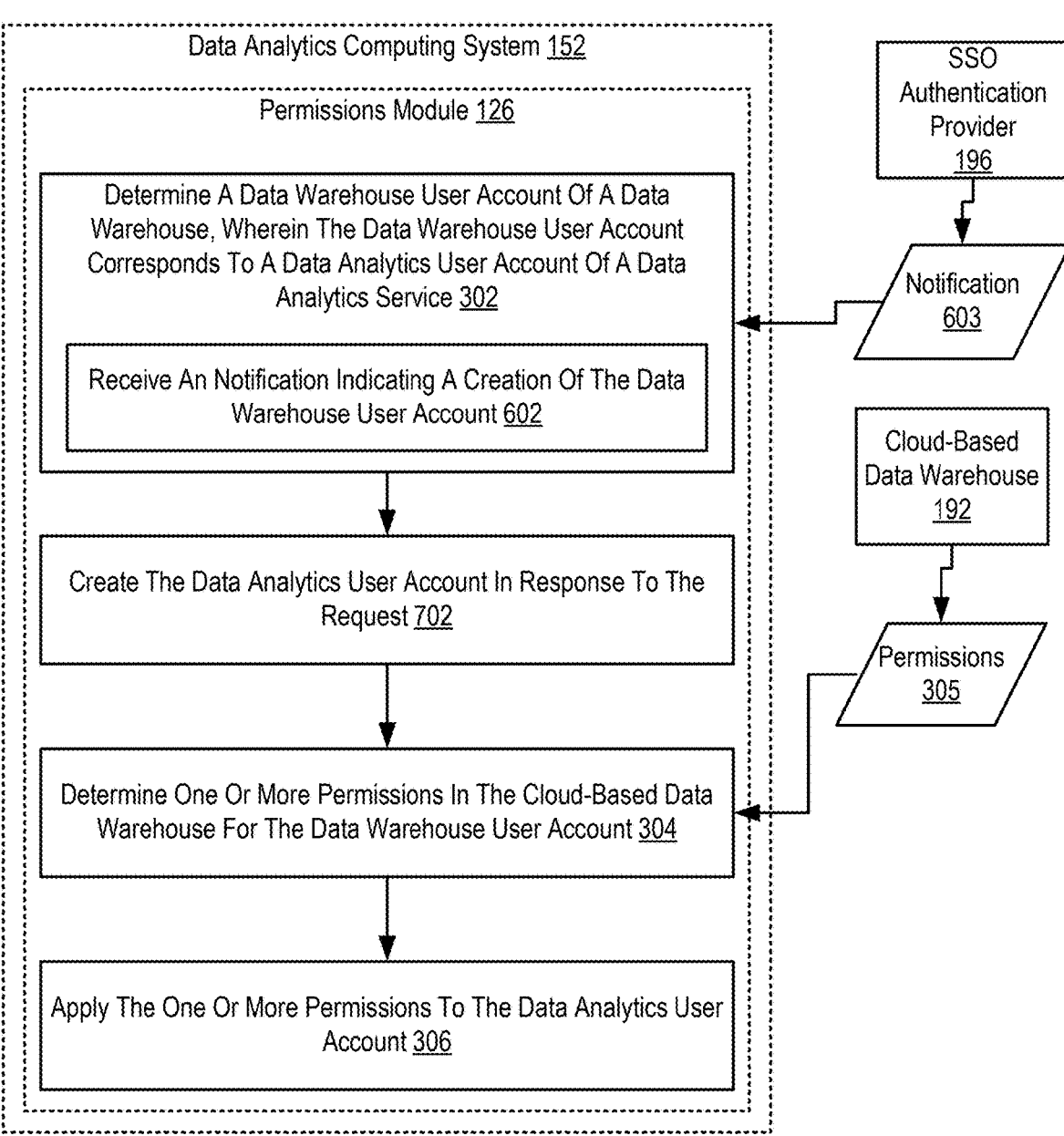
FIG. 7 sets forth a flow chart illustrating an exemplary method for syncing data warehouse permissions using single sign-on authentication according to embodiments of the present invention.

For further explanation, FIG. 7 sets forth a flow chart illustrating an exemplary method for syncing data warehouse permissions using single sign-on authentication according to embodiments of the present invention that includes determining (302) (e.g., by a permissions module (126) of a data analytics computing system (152)) a data warehouse user account of a cloud-based data warehouse (192), wherein the data warehouse user account corresponds to a data analytics user account of a data analytics service, wherein determining (302) the data warehouse user account comprises receiving (602) a notification (603) indicating a creation of the data warehouse user account; determining (304), one or more permissions (305) in the cloud-based data warehouse (192) for the data warehouse user account; and applying (306) the one or more permissions to the data analytics user account.

The method of FIG. 7 differs from FIG. 6 in that the method of FIG. 7 includes creating (702) the data analytics user account in response to the notification (603). The created data analytics user account would share the single sign-on authentication credentials as the data warehouse user account. Creating (702) the data analytics user account may include assigning the data analytics user account to one or more roles. Creating (702) the data analytics user account may also include applying one or more default permissions (305) to the data analytics user account.

In view of the explanations set forth above, readers will recognize that the benefits of syncing data warehouse permissions using single sign-on authentication according to embodiments of the present invention include:

Improving the operation of a computing system by ensuring synchronization of permissions between a user accounts in cloud-based data warehouse and user accounts in a data analytics service accessing the cloud-based data warehouse.

Improving the operation of a computing system by allowing for additional permissions or degrees of permission granularity to be applied to user accounts of the data analytics service after synchronization.

Exemplary embodiments of the present invention are described largely in the context of a fully functional computer system for syncing data warehouse permissions using single sign-on authentication. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of syncing data warehouse permissions using single sign-on (SSO) authentication, the method comprising:
    determining that a data warehouse user account and a data analytics user account correspond to a same user using a SSO authentication credential; and
    equalizing one or more permissions in the data analytics user account and one or more permissions in a cloud-based data warehouse for the data warehouse user account in response to determining a permission in the cloud-based data warehouse for the data warehouse user account is different than a permission in the data analytics user account.

2. The method of claim 1, wherein determining a permission in the cloud-based data warehouse for the data warehouse user account is different than a permission in the data analytics user account comprises:
    requesting, from the cloud-based data warehouse, database metadata; and
    determining, based on the database metadata, the one or more permissions.

3. The method of claim 1, wherein determining a permission in the cloud-based data warehouse for the data warehouse user account is different than a permission in the data analytics user account and equalizing the one or more permissions are performed at a predefined interval.

4. The method of claim 1, further comprising accessing the cloud-based data warehouse using the data warehouse user account.

5. The method of claim 1, wherein determining that the data warehouse user account and the data analytics user account correspond to the same user using the SSO authentication credential comprises receiving a notification indicating a creation of the data warehouse user account.

6. The method of claim 5, further comprising creating the data analytics user account in response to the notification.

7. The method of claim 1, wherein the one or more permissions comprise one or more role-level permissions associated with a role of the data warehouse user account.

8. An apparatus for syncing data warehouse permissions using single sign-on (SSO) authentication, the apparatus comprising a computer processor, a computer memory operatively coupled to the computer processor, the computer memory having disposed within it computer program instructions that, when executed by the computer processor, cause the apparatus to carry out steps of:

determining that a data warehouse user account and a data analytics user account correspond to a same user using a SSO authentication credential; and equalizing one or more permissions in the data analytics user account and one or more permissions in a cloud-based data warehouse for the data warehouse user account in response to determining a permission in the cloud-based data warehouse for the data warehouse user account is different than a permission in the data analytics user account.

9. The apparatus of claim 8, wherein determining a permission in the cloud-based data warehouse for the data warehouse user account is different than a permission in the data analytics user account comprises:

requesting, from the cloud-based data warehouse, database metadata; and determining, based on the database metadata, the one or more permissions.

10. The apparatus of claim 8, wherein equalizing the one or more permissions is performed at a predefined interval.

11. The apparatus of claim 8, wherein the steps further comprise accessing the cloud-based data warehouse using the data warehouse user account.

12. The apparatus of claim 8, wherein determining that the data warehouse user account and the data analytics user account correspond to the same user using the SSO authentication credential comprises receiving a notification indicating a creation of the data warehouse user account.

13. The apparatus of claim 12, wherein the steps further comprise creating the data analytics user account in response to the notification.

14. The apparatus of claim 8, wherein the one or more permissions comprise one or more role-level permissions associated with a role of the data warehouse user account.

15. A computer program product for syncing data warehouse permissions using single sign-on (SSO) authentication, the computer program product disposed upon a non-transitory computer readable storage medium, the computer program product comprising computer program instructions that, when executed, cause a computer to carry out steps of:

determining that a data warehouse user account and a data analytics user account correspond to a same user using a SSO authentication credential; and equalizing one or more permissions in the data analytics user account and one or more permissions in a cloud-based data warehouse for the data warehouse user account in response to determining a permission in the cloud-based data warehouse for the data warehouse user account is different than a permission in the data analytics user account.

16. The computer program product of claim 15, wherein determining a permission in the cloud-based data warehouse for the data warehouse user account is different than a permission in the data analytics user account comprises:

requesting, from the cloud-based data warehouse, database metadata; and determining, based on the database metadata, the one or more permissions.

17. The computer program product of claim 15, wherein equalizing the one or more permissions is performed at a predefined interval.

18. The computer program product of claim 15, wherein the steps further comprise accessing the cloud-based data warehouse using the data warehouse user account.

19. The computer program product of claim 15, wherein determining that the data warehouse user account and the data analytics user account correspond to the same user using the SSO authentication credential comprises receiving a notification indicating a creation of the data warehouse user account.

20. The computer program product of claim 19, wherein the steps further comprise creating the data analytics user account in response to the notification.

\* \* \* \* \*